Feb. 5, 1929.
F. A. HAYES
1,700,981
VARIABLE SPEED POWER TRANSMISSION MECHANISM
Original Filed June 12, 1924   3 Sheets-Sheet 2
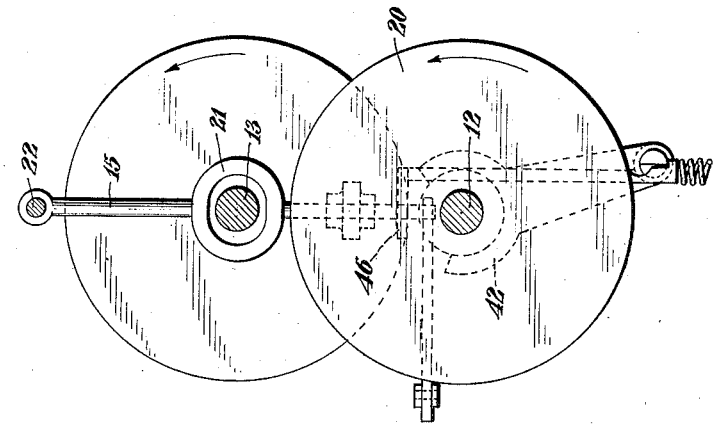
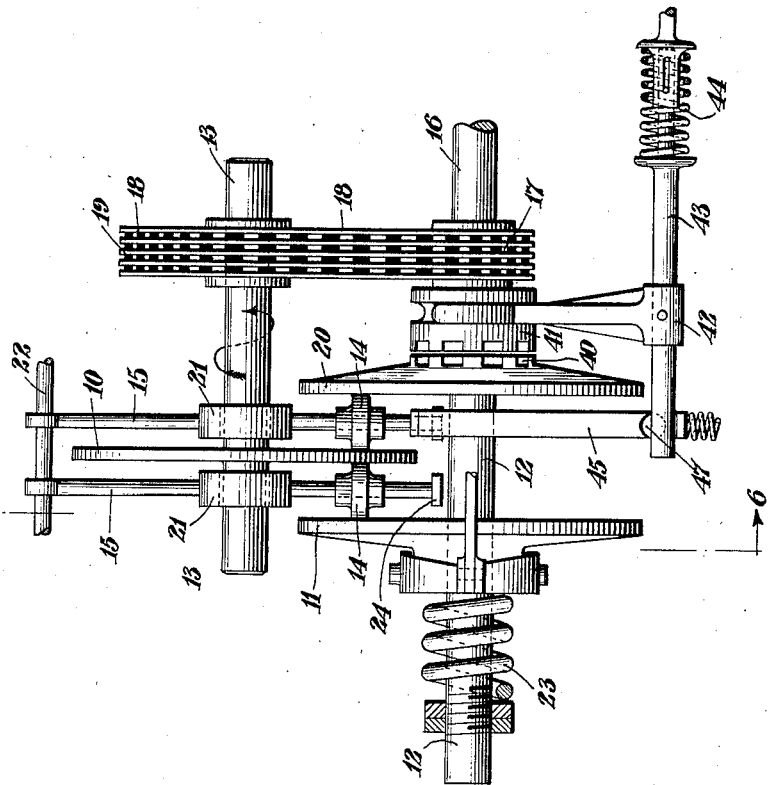
INVENTOR
Frank A. Hayes.
BY
Cooper, Kerr & Dunham
ATTORNEYS Feb. 5, 1929.
F. A. HAYES
1,700,981
VARIABLE SPEED POWER TRANSMISSION MECHANISM
Original Filed June 12, 1924 3 Sheets-Sheet 3
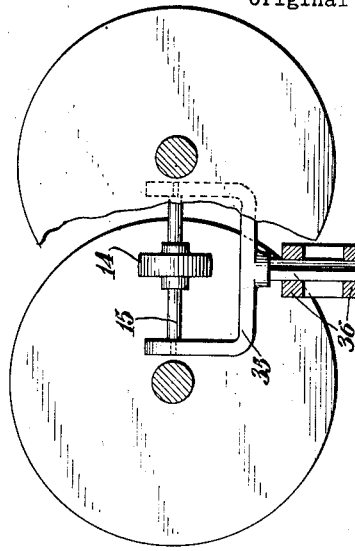
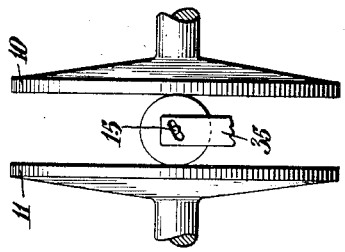
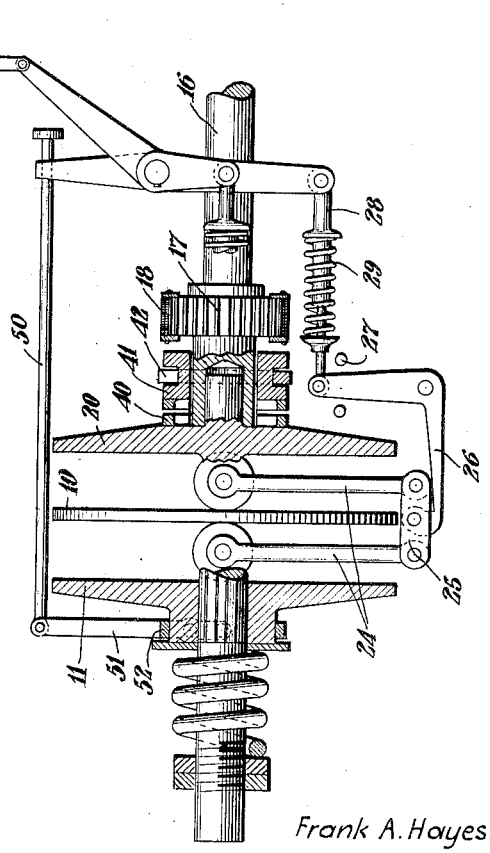
INVENTOR
Frank A. Hayes.
BY
ATTORNEYS Patented Feb. 5, 1929.

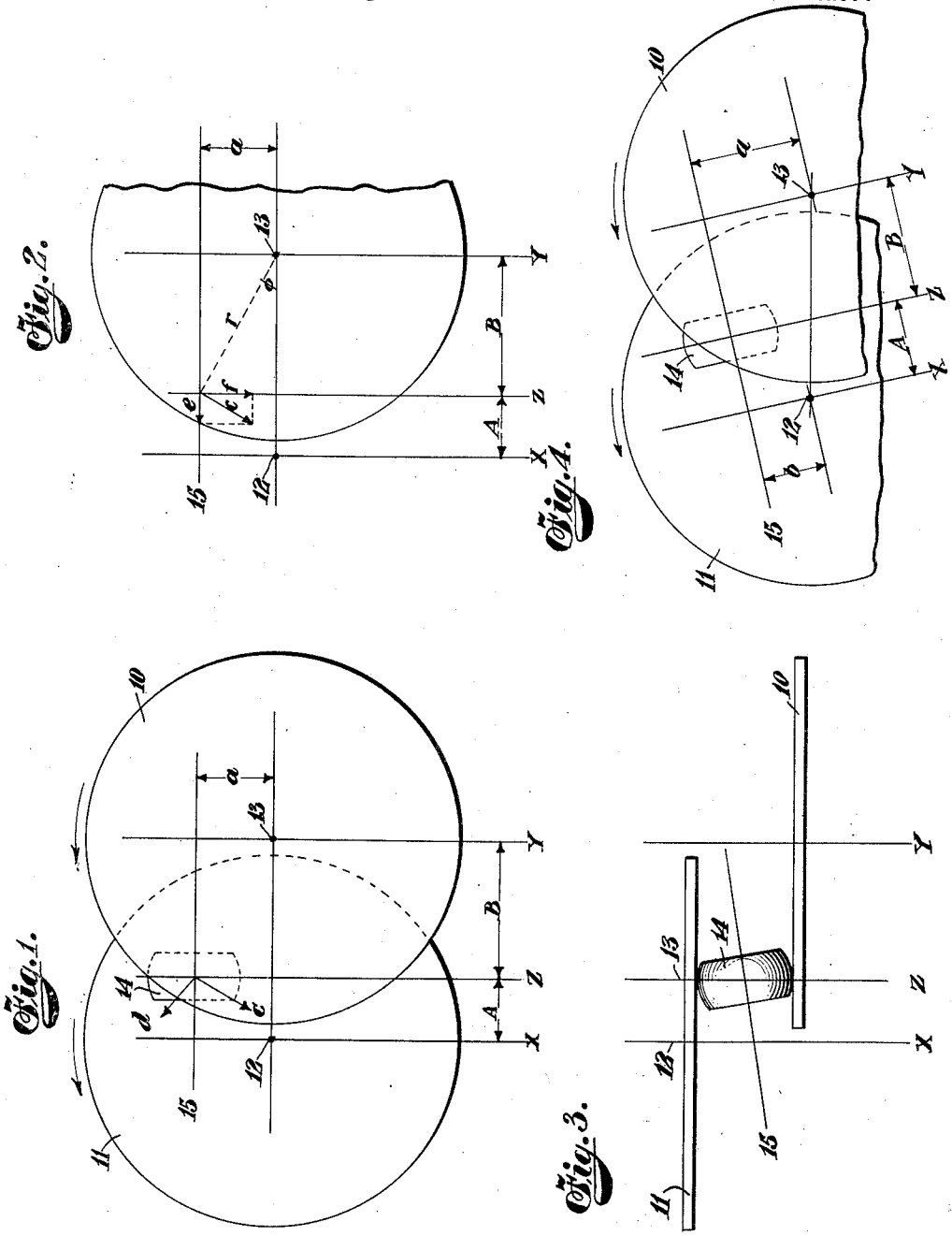

1,700,981

UNITED STATES PATENT OFFICE.

FRANK A. HAYES, OF KEYPORT, NEW JERSEY.

VARIABLE-SPEED POWER-TRANSMISSION MECHANISM.

Application filed June 12, 1924, Serial No. 719,485. Renewed January 5, 1928.

This invention relates to variable-speed power-transmission mechanism of the friction type, in which one rotating disk or element drives another on an axis at an angle to the first. In devices of this class the variation in speed of the driven element is produced by varying the distance between one element and the axis of the other. In prior mechanisms this distance or separation is varied manually or by other external force, and it is usually necessary in such cases to relieve, at least partially, the pressure which produces the driving friction between the elements. Accordingly one object of the present invention is to provide a friction drive mechanism in which the desired shift of one element relative to the other is effected automatically but under the control of the operator. To this and other ends the invention comprises the novel features hereinafter described.

In the preferred form of the invention three disks are employed: a driving disk and two axially spaced driven disks overlapping the first on opposite sides and mounted on a shaft which is parallel to the shaft of the other. Between the driving disk and the first driven disk, and in frictional contact with both, is a transmission wheel, freely rotatable and axially movable on a shaft or spindle which can be swung or otherwise shifted across the plane of the axes of the disks. Between the driving disk and the second driven disk is a similar wheel, similarly mounted, so that the latter driven disk is actuated by the driving disk through the agency of the second wheel. In such construction the change of speed of the driven disk relative to the driving disk is effected by axial movement of the transmission wheels on their spindles, which movement is produced automatically, as explained hereinafter, whenever the transmission wheels are shifted to one side or the other of the plane of the disk axes.

The embodiment outlined above is illustrated in the accompanying drawings, in which Fig. 1 is a diagrammatic axial view showing a driving disk and a driven disk, with a transmission wheel between the two, and indicating the motions which the disks tend to impart to the wheel.

Fig. 2 is a diagram showing the components of the motion imparted to the transmission wheel when it is above the plane of the disk axes.

Fig. 3 is a diagrammatic plan view of the parts illustrated in Fig. 1, showing the axis of the transmission wheel tilted in a horizontal plane.

Fig. 4 is a diagrammatic view similar to Fig. 1 but showing the axis of the wheel tilted in a vertical plane.

Fig. 5 is a plan view of the transmission mechanism.

Fig. 6 is a cross section, about on line 6—6 of Fig. 5.

Fig. 7 is a side view.

Fig. 8 is a detail cross section illustrating a modification.

Fig. 9 is a detail side view from the left of Fig. 8.

In Figs. 1, 2, 3 and 4, the disk 10 drives the overlapping disk 11, on parallel axes 12, 13, through the agency of the transmission wheel 14, which is shown above the horizontal axial plane 12—13. Lines X, Y and Z represent parallel planes, X through the axis 12 of disk 11, Y through the axis 13 of disk 10, and Z through the points at which the transmission wheel is in contact with the disks. In Figs. 1, 2 and 4 the three planes are perpendicular to the axis of the wheel 14, represented by the line 15.

The instantaneous direction of the motion of any point on a disk rotating about a horizontal axis is tangential, that is, perpendicular to the radius drawn through the point, and the velocity of the point can be resolved into components one of which is horizontal and the other vertical. The horizontal component represents the motion of the wheel 14 on its axis, which is hereinafter termed "translation". The vertical component represents motion toward or from the plane 12—13, and may be termed "displacement." Referring to Fig. 1, in which disk 10, rotating in the direction of the arrow, drives disk 11 through wheel 14, the arrow *c* represents the direction and velocity, of the point of contact of disk 10 on the wheel, and hence (neglecting slip and centrifugal force) the motion which the disk tends to impart to the wheel. Similarly, the arrow *d* represents the direction and velocity of the point of contact of the wheel on disk 11. Hence it represents the motion which disk 11 tends to impart to the wheel. The actual movement of the wheel is the resultant of these two velocities. Since both velocities have a component directed toward the left, it will be seen that the resultant movement of the wheel will be leftward. It will also be seen that when the wheel is below the axial plane 12—13 the two horizontal components are toward the right and hence the wheel will move rightwardly. Further, each velocity ($c, d$) has a vertical component, one upward and the other downward, causing the wheel to move up or down according to which vertical component is the greater.

Referring to Fig. 2, $e$ is the translational component and $f$ the vertical or displacement component, of the velocity $c$. Drawing the radius $r$ to the point of contact, it is seen that $$e = c \sin \Phi = ca/r.$$

But $$c = 2\pi r N_1,$$

where $N_1$ is the angular speed of the disk. Hence $$e = 2\pi a r N_1 / r = 2\pi a N_1.$$

Similarly, the value of the translational component of velocity $d$, Fig. 1, is found to be $2\pi a N_2$, in which $N_2$ is the angular speed of disk 11. It will therefore be seen that the two translational components are equal only when $N_1 = N_2$; that is, since disk 11 is driven by disk 10, the components mentioned are equal only when the points of contact on the wheel are in a plane midway between the axes 12, 13. The distances A and B are then equal. It will also be seen that when the points of contact of the wheel on the disks are in the plane of the axes 12—13, $a$ is zero and the translational components vanish. By like reasoning it is found that the values of the vertical or displacement components are $-2\pi B N_1$ and $2\pi A N_2$ for disks 10 and 11 respectively. The minus sign before the first value follows from the fact that $\Phi$ being in the second quadrant its cosine is negative. From the foregoing it is clear that the displacement components are equal (and their sum is zero) when $$BN_1 = AN_2,$$

that is, when $$N_1/N_2 = A/B.$$

Whenever the displacement components are unequal the wheel moves in the direction of the greater component. This involves no slippage, however, since so far as displacement is concerned the wheel has pure rolling contact with the disks. On the other hand, inequality of the translational components causes slippage of the wheel on one disk or the other or causes the axis of the wheel to tilt in its horizontal plane, as in Fig. 3. It will be observed from this figure that if the surface of the wheel is spherical the tilt of its axis of revolution does not alter the speed ratio of the disks, since the line of contacts, in the plane Z, is unchanged. It will also be observed that inequality of displacement velocities does not produce slip.

If the axis of the wheel 14 is tilted in the vertical plane, as in Fig. 4, the translational components for the disks 10 and 11, respectively, are $2\pi a N_1$ and $2\pi b N_2$. These are equal if $$N_1/N_2 = b/a;$$

but since $$N_1/N_2 = A/B,$$

the translational components are always equal if $$a/b = B/A,$$

in which case there is no slip and pure rolling contact results. This condition of $$a/b = B/A$$

can be met by design of the apparatus, of which a suitable construction for the purpose is described hereinafter. It will also be observed in Fig. 4 that tilting the axis of the wheel in the vertical plane does not vary the speed ratio, since the line of contacts in plane Z is unchanged although the plane itself is shown tilted.

If the two disks are rotated by independent sources of power the wheel will automatically assume a position in the plane 12—13 corresponding to the speed ratio of the disks, and the translational movement of the wheel can therefore be utilized to actuate a pointer or other means for indicating, registering, or recording this ratio.

Referring now to Figs. 5, 6 and 7, the driving disk 10 is fixed on shaft 13, which may be driven in any suitable way, as for example by a power-shaft 16 connected to the shaft mentioned by means of a sprocket 17, chain 18 and sprocket 19. Driven disk 20 is fixed on shaft 12 and driven disk 11 is splined thereon. The transmission wheels 14 are freely rotatable and axially movable on spindles 15, pivoted on pin 22 in the plane of shafts 12 and 13 and provided with apertured enlargements 21 through which shaft 13 extends, the shaft apertures being large enough to permit adequate swinging movement of the spindles in their own planes. The wheels and disks are pressed into firm contact by a spring 23, encircling shaft 12 between the hub of disk 11 and a pair of adjustable locknuts on the shaft. The wheels and disks are preferably made of hardened steel, and may be immersed in oil in a suitable housing or casing, not shown.

The free ends of spindles 15 are connected by links 24 to an equalizer yoke 25 pivoted to a bell crank lever 26 playing between stops 27 and connected by a permissive link 28 and spring 29 to a hand lever 30 which may be locked in any desired position by the detent 31 cooperating with the recessed quadrant 32.

Assuming that the transmission wheels 14 are to be shifted, to increase the speed of disks 11, 20: for this purpose lever 30 is rocked clockwise, thereby compressing spring 29 and putting a downward pull on links 24, Fig. 7, which draws the transmission wheels to the left of the axial plane of disks 10, 20, Fig. 6. Noting the direction of rotation as indicated by the arrow on shaft 13, Fig. 5, it will be seen that the translational velocities at the points of contact with the disks are now directed toward shaft 12. The transmission wheels will therefore move axially on their spindles toward the shaft just mentioned (thereby increasing the speed ratio of the drive) until the torque resistance of disks 11, 20 is sufficient to overcome the tension of spring 29, whereupon the wheels will return to the axial plane. At this plane the translational velocities are zero, and the axial movement of the wheels ceases. The speed ratio then remains constant, at a value determined by the tension put upon spring 29 by lever 30. To decrease the speed ratio the lever is rocked counterclockwise, thereby decreasing the tension of spring 29 (which may have an initial tension) and permitting wheels to move to the right of the axial plane of disks 11, 20, (Fig. 6) after which they move toward shaft 13 and then move to the axial plane at a point determined by the tension of spring 29.

Inasmuch as slight displacement of the wheels from the axial plane is sufficient to cause rapid translation, the lever arm between the link 28 and fulcrum 33 can be short, so that very little effort on the lever is needed to produce the desired change of speed ratio, even when the mechanism is transmitting considerable power.

From the discussion of the theory of the mechanism it will be remembered that above or below (or to the right or left of) the axial plane of the disks and nearer one axis than the other, the translational components are unequal and that there is then a slight slip on one of the disks, tending to tilt the axes of the transmission wheels in a plane parallel to the plane of the disk axes, but that this tilting tendency can be utilized to tilt the wheel axes in a plane parallel to the surfaces of the disks in such a way that the condition necessary for pure rolling contact is obtained. One construction suitable for the purpose is illustrated in Figs. 8 and 9. In this figure the ends of the wheel spindles 15 are mounted (rotatably therein if desired but incapable of longitudinal movement) in a fork 35 adjustable vertically in fixed guides 36 by means of the bell crank lever 37 which can be rocked by a spring permissive link 38 similar to that shown at 28 in Fig. 7. The arms of the fork 35 are provided with slots to receive the ends of the wheel spindle, and these slots are inclined, as indicated at 39, Fig. 9, from which it will be seen that as the wheel spindle tilts in the horizontal plane in response to inequality of the translational velocities the slot in one arm will cause that end of the spindle to move up, and at the same time the other end will be caused to move down by the slot in which it is mounted. The spindle is thus tilted vertically as well as horizontally. The horizontal tilt (Fig. 3) is progressive, and varies directly as the inequality of the translational velocities of the two disks, and it will readily be seen that if the spindle slots in the arms of the carrier fork are arranged at an angle of 45° to the plane of the disk axes the vertical tilt of the wheel spindle will vary at the same rate as the horizontal tilt, and therefore directly as the inequality of the translational velocities. This means (see Fig. 4) that as the wheel 14 approaches the plane X, thereby decreasing A and increasing B, its axis tilts farther from the axial plane 12—13 of the disks, thereby decreasing $b$ and increasing $a$, so that $b/a$ is always equal to A/B. It will be understood that all the transmission wheel shafts will be controlled in the same manner, if more than one transmission wheel is employed.

In the construction shown in Figs. 5, 6 and 7, provision is made for driving shaft 12 directly from shaft 16. For this purpose disk 20 is provided with a jaw-clutch member 40 to cooperate with a like member 41 splined on shaft 16 and shiftable into and out of engagement with the first by means of a fork 42 fixed on the permissive shift rod 43, composed of telescoping parts extended by a spring 44. The end of the part to which the fork is fixed has a notch engaging the spring-actuated sliding latch 45 and is therefore locked when the latch is in its inner position. When the hand lever is given a certain clockwise throw (which is the direction of increasing speed ratio) it engages the rod 43 and compresses spring 44. Then as the transmission wheel 14 (the wheel on the right of disk 10, Fig. 5) travels toward shaft 12 it eventually strikes the finger 46, Fig. 6, on the latch 45 and shifts the latter outwardly, which brings the notch 47 into register with the notch in rod 43, whereupon spring 44, previously compressed, advances the fork 42 and engages the clutch members. At this instant clutch member 40 is rotating at a speed very close to that of member 41, and hence the engagement is effected quietly and without shock. Further movement of the hand lever causes it to engage and shift rod 50, thereby actuating lever 51, which acts on collar 52 and separates the disks, thereby putting the friction transmission out of action.

It is to be understood that the invention is not limited to the specific mechanism herein specifically described but can be embodied in other forms without departure from its spirit.

I claim—

1. In a variable-speed power-transmission mechanism, in combination, a pair of axially spaced overlapping friction disks rotatable on parallel axes, a friction transmission wheel in contact with both disks and movable axially, and means for shifting the transmission wheel across the plane of the disk axes on a center eccentric to both said axes.

2. In a variable-speed power-transmission mechanism, in combination, a pair of overlapping friction disks rotatable on parallel axes, a shaft extending between the disks in the plane of the disk axes, a friction transmission wheel rotatable and axially movable on the said shaft and in contact with the disks, and means for displacing the transmission wheel shaft across the plane of the disk axes on a center eccentric to both said axes.

3. In a variable-speed power-transmission mechanism, in combination, a pair of overlapping friction disks rotatable on parallel axes, a shaft between the disks in the plane of the disk axes and pivoted to swing across the plane of the said axes on a center eccentric to both, a friction transmission wheel rotatable and axially movable on the shaft, and in contact with the disks to drive one from the other, and means for tilting the shaft at an angle to the plane of the disk axes.

4. In a variable-speed power-transmission mechanism, in combination, a pair of axially spaced coaxial friction disks, an intermediate friction disk extending between the axially spaced disks and having its axis parallel to the axes thereof, a pair of friction transmission wheels axially movable between the intermediate disk and the first mentioned disks, and means for displacing the transmission wheels across the plane of the disk axes on a center eccentric to both said axes.

5. In a variable-speed power-transmission mechanism, in combination, a driven shaft, a pair of axially spaced driven disks thereon to drive the same, a driving shaft parallel to the driven shaft, a driving disk on the driving shaft and extending between the driven disks, axially movable friction transmission wheels between the driving and driven disks, and means for displacing the transmission wheels across the plane of the disk axes on a center eccentric to both said axes.

In testimony whereof I hereto affix my signature.

FRANK A. HAYES.